United States Patent
Ojima et al.

(10) Patent No.: US 6,843,827 B2
(45) Date of Patent: Jan. 18, 2005

(54) METHOD OF SMELTING COPPER SULFIDE CONCENTRATE

(75) Inventors: Yasuo Ojima, Ehime-ken (JP); Yasuhiro Kondo, Ehime-ken (JP); Kazunori Kawanaka, Ehime-ken (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 09/933,721

(22) Filed: Aug. 22, 2001

(65) Prior Publication Data

US 2002/0043133 A1 Apr. 18, 2002

(30) Foreign Application Priority Data

Aug. 22, 2000 (JP) .................................. 2000-250699

(51) Int. Cl.$^7$ .............................................. C22B 15/00
(52) U.S. Cl. ............................. 75/424; 75/641; 75/643; 75/645
(58) Field of Search .......................... 75/424, 641, 643, 75/645, 650

(56) References Cited

U.S. PATENT DOCUMENTS

| | | | |
|---|---|---|---|
| 4,504,309 A | 3/1985 | Mackey et al. | |
| 4,544,141 A | 10/1985 | Mackey et al. | |
| 5,194,213 A | 3/1993 | Diaz et al. | |
| 6,416,565 B1 * | 7/2002 | Yazawa et al. | ................ 75/424 |

FOREIGN PATENT DOCUMENTS

| | | | | |
|---|---|---|---|---|
| CA | 1 218 238 | 2/1987 | | |
| GB | 2 350 122 A | 11/2000 | | |
| JP | 57-41333 | 3/1982 | | |
| JP | 58-224128 | 12/1983 | | |
| JP | 60-92434 | 5/1985 | | |
| JP | 1-268823 | 10/1989 | | |
| JP | 1-268824 | 10/1989 | | |
| JP | 5-15769 | 3/1993 | | |
| JP | 5-214460 | 8/1993 | | |
| JP | 10-147821 | 6/1998 | | |
| JP | WO 00/09772 | * | 2/2000 | ........... C22B/15/14 |
| JP | 2000-63963 | 2/2000 | | |

OTHER PUBLICATIONS

Patent Abstracts of Japan English translation of JP 2000–063963 Feb. 29, 2000.*

* cited by examiner

*Primary Examiner*—Melvyn Andrews
(74) *Attorney, Agent, or Firm*—Finnegan, Henderson, Farabow, Garrett & Dunner, L.L.P.

(57) ABSTRACT

The method for smelting copper sulfide concentrate essentially consisting of the steps of: adding $SiO_2$ source material and CaO source material for flux to the copper sulfide concentrate, and subjecting the copper sulfide concentrate to oxidation melting to produce slag and at least one selected from the group of white metal and blister copper, so that at least part of Fe in the copper sulfide concentrate is removed to the slag while at least part of S is removed in the form of $SO_2$, and that copper is concentrated in the form of at least one selected from the group of white metal and blister copper, and wherein the composition of the slag is controlled such that the weight ratio $CaO/(SiO_2+CaO)$ is in the ramge of 0.6 to 0.85, while the weight ratio $Fe/(FeO_x+SiO_2+CaO)$ is in the range of 0.5 to 0.6.

9 Claims, No Drawings

METHOD OF SMELTING COPPER SULFIDE CONCENTRATE

BACKGROUND OF THE INVENTION

1. Field of the Invention

The present invention relates to a pyrometallurgical process for copper smelting, and more particularly relates to a process for obtaining blister copper or white metal ($Cu_2S$), wherein the term "white metal" is meant to cover a matte near the white metal (with very little FeS) in addition to $Cu_2S$, by oxygen-smelting copper sulfide concentrate, or matte obtained from copper sulfide concentrate.

2. Description of the Related Art

Heretofore, copper smelting has comprised: a matte smelting process in which copper sulfide concentrate is oxygen smelted, part of the Fe in the ore is oxidized to be removed as slag, and part of the S becomes $SO_2$, so that Cu is concentrated into matte, being a mixture of FeS and $Cu_2S$; a subsequent white metal production process which obtains white metal ($Cu_2S$) containing a almost no Fe, after removing Fe as slag with further oxidation of the obtained matte; and a copper production process which obtains blister copper by further oxidation of this white metal. An autogenous smelting furnace is generally used as the matte smelting furnace, while the white metal production process and the copper production process are usually carried out in a converter. The converting furnace is a batch type.

Since copper sulfide concentrate normally contains $SiO_2$ as gangue, the matte smelting process uses iron silicate slag. The converter also normally forms iron silicate slag by the addition of silica minerals as flux.

A matte smelting furnace produces matte, in which the copper content of the matte (matte grade; MG) is normally 70% or less by weight, and charges this into the converter. A converter, being a batch type, converts the matte into white metal, and subsequently into blister copper as describes above. To increase the productivity of the whole plant, it is desired to increase the MG in a matte smelting furnace and reduce the load in a batch type converter. If the matte smelting furnace can continue oxidization until white metal is produced, the white metal production process in the converter becomes necessary. Furthermore, if it can oxidize to blister copper, the converter process itself becomes unnecessary. However, if an attempt is made to increase the oxidation degree in the matte smelting furnace, the following problems caused by iron silicate slag occur.

(1) Magnetite complications:

In iron silicate slag, the solubility of trivalent Fe is low. This causes so-called magnetite complications wherein solid magnetite is precipitated and deposited on the bottom of the furnace, and the like. To avoid this problem, in the case when MG is increased, the smelting temperature must be raised up to 1300° C. or more. However, this accelerates damage to the furnace body. Furthermore, when the copper content of the slag is increased by oxidizing part of the copper, even though iron silicate slag can produce blister copper without magnetite complications, the copper content of the slag in this case needs to be 25% or more and the yield of blister copper is considerably lowered.

(2) Oxidation and dissolution of copper:

As MG increases, the solubility of copper, as oxide, in iron silicate slag increases considerably.

(3) Concentration of impurities:

In the presence of iron silicate slag and matte or blister copper, since the solubility of oxides of As, Sb and the like into iron silicate slag is low, these impurities concentrate into the matte or the blister copper. The effect is particularly high when iron silicate slag and blister copper coexist, and this is regarded to be one of the reasons why blister copper cannot be obtained directly from copper sulfide concentrate with high impurities in the presence of iron silicate slag.

From these points, a matte smelting furnace is normally operated with approximately 65 to 70% MG as the upper limit.

Furthermore, because of similar problems, in a process of oxidizing matte into low S content of blister copper, continuous processing is regarded to be impossible in the presence of iron silicate slag, and usually a batch process using a converter is carried out. There is a report (Japanese Unexamined Patent Publication No. Sho 58-224128) describing blister copper continuously obtained from matte in the presence of iron silicate slag. In this case, however, blister copper was obtained in the presence of three phases of slag, white metal and blister copper, and it was unavoidable for the S content of the blister copper thereof to be as high as 1.5%, increasing the load of the operation in the following processes, a refining furnace, considerably.

Avoiding these problems, one of the inventors of the present invention has proposed a method to produce white metal in a matte smelting furnace in Japanese Examined Patent Publication No. Hei 5-15769. This is to remove iron in copper sulfide concentrate as calcium ferrite slag by adding lime as flux. There is an advantage in the use of calcium ferrite slag in that precipitation of magnetite is avoided and the elimination of impurities such as As, Sb or the like in the slag is higher than iron silicate slag. However, there are problems as described below.

(1) Copper sulfide concentrate normally contains some $SiO_2$. Therefore to produce as pure a calcium ferrite slag as possible, the copper sulfide concentrate to be processed is restricted to that with a low content of $SiO_2$ (3% or less).

(2) Even with copper sulfide concentrate with a low content of $SiO_2$ as mentioned above, if there is a little $SiO_2$ in the calcium ferrite slag, it worsens the viscosity and causes foaming, which renders it difficult to have a stable furnace operation. Therefore, when calcium ferrite slag is used, the content of $SiO_2$ in the slag should be regulated to be 1% or less (about 1.7% or less by weight with respect to Fe in the slag). In the case of obtaining white metal from standard copper sulfide concentrate mainly composed of chalcopyrite with this method, the $SiO_2$ content of the copper sulfide concentrate is restricted to 0.4% or less for practical purposes.

(3) Since the solubility of Pb into calcium ferrite slag is low, Pb is difficult to distribute into the slag, and becomes concentrated in the white metal.

(4) The amount of copper dissolving into the calcium ferrite slag as oxide is large, and the recovery percentage by concentration is low.

On the other hand, in a converter process, when matte is converted into white metal or blister copper by further oxidation, to avoid the problems caused by iron silicate slag, the process being in batches, the furnace temporarily stops blowing in the presence of white metal and slag and tilts to remove the slag, leaving only the white metal in the converter to oxidize into blister copper. This method, which has various drawbacks caused by the batch type process, makes the converter operation cumbersome.

The Mitsubishi continuous copper smelting process avoids magnetite precipitation by using calcium ferrite slag in the process of a converter (C furnace) and produces blister copper continuously from matte of approximately 65% MG. However, there are the following problems caused by calcium ferrite slag.

(1) The copper content or the slag changes continuously with respect to oxygen partial pressure, and as the S content of the blister copper is lowered, the copper content of the slag becomes higher. In practice, when the S content of the blister copper is approximately 0.5 to 1%, the Cu content of the slag is 13 to 15%, and it is not effective in terms of copper yield for the S content to be less than or equal to this.

(2) The copper content in calcium ferrite slag is mainly oxide which is chemically dissolved, and even with slow cooling, the copper recovery rate by concentration is low.

(3) As aforementioned, when the $SiO_2$ of calcium ferrite slag reaches approximately 1 to 3%, the viscosity increases considerably and foaming occurs. Therefore, it is difficult to use matte containing iron silicate slag as raw material. When the Fe content of matte is 10%, the $SiO_2$ allowed to mix into the matte is 0.2% or less with respect to the matte, and it is necessary to pay special attention to avoid the slag mixing into the matte produced in the matte smelting process.

(4) Since Pb solubility is low, Pb is difficult to distribute into the slag, so that it becomes concentrated in the blister copper. It is therefore difficult to produce an anode capable of electrolysis from high Pb content raw material with a conventional process.

(5) When compared at the same temperature, because its permeability in refractories is high, it cause greater erosion of refractories in the converter than silicate slag.

In regards to iron calcium silicate slag, Japanese Patent Unexamined Publication No. 2000-63963 proposes an area in which a weight ratio of $CaO/(SiO_2+CaO)$ is 0.3 to 0.6, and a weight ratio of $Fe/(FeO_x+SiO_2+CaO)$ is 0.2 to 0.5. This area is determined because the slag that is separated from the area is not completely molten and compounds with a high melting point are precipitated out at normal smelting temperature up to 1350° C. in the production conditions for the while metal, the matte close to white metal or the blister copper.

SUMMARY OF THE INVENTION

It is therefore an object of the present invention to provide a copper sulfide concentrate smelting process for producing white metal or blister copper with continuous oxidation of copper sulfide concentrate or matte at 1280° C. or less which is the temperature for copper smelting without magnetite complications.

Another object of the present invention is to provide a smelting method for copper sulfide concentrate which is applicable for the treatment of copper sulfide concentrate or matte containing $SiO_2$ with less loss of copper to slag.

A further object of the invention is to provide a smelting method for copper sulfide concentrate in which high removability of As, Sb and Pb into slag is achieved.

Yet another object of the invention is to provide a smelting method for copper sulfide concentrate with less erosion of refractories.

DESCRIPTION OF THE PREFERRED EMBODIMENTS

According to one feature of the present invention, the method of smelting copper sulfide concentrate comprises a smelting process consisting of the steps of adding $SiO_2$ source material and CaO source material for flux to the copper sulfide concentrate, and subjecting the copper sulfide concentrate to oxidation melting to produce slag and at least one selected from the group of white metal and blister copper, so that at least part of Fe in the copper sulfide concentrate is removed to the slag while at least part of S is removed in the form of $SO_2$, and that copper is concentrated in the form of at least one selected from the group of white metal and blister copper, and wherein the composition of the slag is controlled such that the weight ratio $CaO/(SiO_2+CaO)$ is in the range of 0.6 to 0.85, while the weight ratio $Fe/(FeO_x+SiO_2+CaO)$ is in the range of 0.5 to 0.6.

In this feature, the slag produced is slowly cooled for solidification, crushed and subjected to flotation for copper recovery, and the copper obtained is returned to the smelting process.

It is desirable that the content of $SiO_2$ in the copper sulfide concentrate is at least 1.7% by weight with reference to the Fe to be removed into the slag, and that the temperature of the produced slag is controlled up to 1280° C.

In another feature of the present invention, the smelting method for copper sulfide concentrate comprises a matte smelting process for subjecting the copper sulfide concentrate to oxidation melting, wherein at least part of Fe in the copper sulfide concentrate is removed to the slag while at least part of S is removed in the form of $SO_2$, whereby matte consisting of a mixture of FeS and $Cu_2S$ is produced, and a smelting process consisting of the steps of adding $SiO_2$ source material and CaO source material for flux to the matte, and subjecting the matte to oxidation melting to produce second slag and blister copper, so that at least part of Fe in the copper sulfide concentrate is removed to the second slag while at least part of S is removed in the form of $SO_2$, whereby blister copper is obtained, and wherein the composition of the second slag is controlled such that the weight ratio $CaO/(SiO_2+CaO)$ is in the range of 0.6 to 0.85, while the weight ratio $Fe/(FeO_x+SiO_2+CaO)$ is in the range of 0.5 to 0.6.

In this feature of the invention, at least one of the first and second slags is slowly cooled for solidification, and returned to the matte smelting process.

It is desirable that at least one of the first and second slags is slowly cooled for solidification, crushed and subjected to flotation for copper recovery, and the copper obtained is returned to the matte smelting process, and that at least one of the first and second slags in molten state is returned to the matte smelting process.

It is also desirable that the content of $SiO_2$ in the copper sulfide concentrate is at least 1.7% by weight with reference to the Fe to be removed into the second slag, and that the temperature of the second slag is controlled up to 1280° C.

The characteristics of slag that occur in conditions of high partial pressure of oxygen when producing white metal or blister copper are compared and shown in Table 1.

a: Iron silicate slag that is used in conventional copper smelting.

b: Calcium ferrite slag that is used in the Mitsubishi method.

c: Iron calcium silicate slag that is used in this invention.

TABLE 1

| | Slag Characteristics | | |
|---|---|---|---|
| | Iron silicate slag | Calcium ferrite slag | Iron calcium silicate slag |
| Law Viscosity | X High | ◯ Low | ◯ Low |
| Low suspension of matte and blister copper | X Much | ◯ Little | ◯ Little |
| Low oxidation and dissolution of copper | X Much | X Much | ◯ Little |
| Low sulfurization and dissolution of copper | ◯ Little | X Much | X Much |
| High Pb solubility | ◯ High | X Low | ◯ High |
| Solubility of As and Sb | X Low | ◯ High | ◯ High |
| Magnetite solubility | X Low | ◯ High | ◯ High |
| Less erosion of refractories | ◯ Little | X Much | ◯ Little |

Iron calcium silicate slag has various advantages, however, in the actual investigation performed by the inventors, it was found that on the low $SiO_2$ side where the weight ratio $CaO/(SiO_2+CaO)$ is greater than 0.85, the viscosity of slag becomes poor and operation becomes difficult, and when the weight ratio $CaO/(SiO_2+CaO)$ is less than 0.85, then slag melts at a temperature of 1280° C. or less with no problem and melting of copper oxide into the slag becomes low. As a result, the amount of slag decreases, and when the lost copper is evaluated as, Slag amount× Copper grade=Copper loss, it was found that with the conventional method (the amount of lost copper with the present invention becomes is less than with high MG matte smelting method, white metal smelting method or direct copper refining method using iron silicate slag or calcium ferrite slag) and even less than with the method disclosed in Japanese Patent Unexamined Publication No. 2000-63963.

The area of this invention where the weight ratio $CaO/(SiO_2+CaO)$ is 0.6 to 0.85, and the weight ratio $Fe/(FeO_x+SiO_2+CaO)$ is 0.5 to 0.65, is separated from the melting area at 1280° C. for the conventionally known ternary compounds $FeO—SiO_2—CaO$, $FeO.Fe_2O_3—SiO_2—CaO$ and $Fe_2O_3—SiO_2—CaO$ shown in the ternary phase diagram. In other words, a melt area such as at 1280° C. appears only in areas where the amount of FeO or $Fe_2O_3$ is large.

However, in actual production conditions of the matte near the white metal or the blister copper, it is thought that the size of the melt area at a temperature such as 1280° C. increases depending on the copper oxide that is molten into the slag. In order to clarify this point, it is necessary to establish a quaternary phase diagram for the quaternary compound $Fe_2O_3$ (FeO)—CuO—$SiO_2$—CaO.

EXAMPLE 1

The composition of copper sulfide concentrate, silica powder, and lime powder (each is ground to a size of 200 μm or less) was prepared to the specified ratios shown in Table 2 and dried to obtain dry ore. In a small flash smelting furnace having a reactor with an internal diameter of 1.5 m and height 3.5 m, and settler with internal diameter of 1.5 m and length 5.2 m, the aforementioned dry ore was blown into the reactor together with 50% oxygen enriched air from a concentrate burner located at the top of the reactor, to obtain matte and slag. There is a heavy-oil burner in the concentrate burner, and the amount of heavy oil was regulated such that a heat balance inside the reactor was maintained. Operation was carried out for three days. The obtained results are shown in Table 2. From Table 2 it can be seen that, high-grade (75% MG) matte that was near the white metal was stably obtained. The smelt conditions were: 454 Nm³/h blast air in the concentrate burner, oxygen-enriched air of 50% oxygen, 43 l/h heavy oil flow, 1250° C. average temperature of produced slag, and 1153° C. average temperature of produced matte.

TABLE 2

| | | Amount of material | (Weight %) | | | | |
|---|---|---|---|---|---|---|---|
| | | (kg/h) | Cu | Fe | S | $SiO_2$ | CaO |
| Processing | Copper sulfide concentrate | 1031 | 32.8 | 25.0 | 30.3 | 5.8 | — |
| | Silica | 10 | — | 1.4 | — | 94.4 | — |
| | Lime | 202 | — | — | — | — | 54.4 |
| Production | Molten matte | 494 | 75.8 | 1.1 | 20.1 | — | — |
| | Molten slag | 630 | 1.5 | 43.2 | — | 10.1 | 16.6 |

EXAMPLE 2

The composition of copper sulfide concentrate, silica powder, and lime powder (each was ground to a size of 200 μm or less) was prepared to the specified ratios shown in Table 3 and dried to obtain dry ore. In a small flash smelting furnace having a reactor with an internal diameter of 1.5 m and height 3.5 m, and settler with internal diameter of 1.5 m and length 5.2 m, the aforementioned dry ore was blown into the reactor together with 50% oxygen enriched air from a concentrate burner located at the top of the reactor, to obtain blister copper and slag. There is a heavy-oil burner in the concentrate burner, and the amount of heavy oil was regulated such that a heat balance inside the reactor was maintained. Operation was carried out for three days. The obtained results are shown in Table 3. From Table 3 it can be seen that blister copper with a S grade of 0.98% was stably obtained, The smelt conditions were: 833 Nm³/h blast air in the concentrate burner, oxygen-enriched air of 50% oxygen, 25 l/h heavy oil flow, 1270° C. average temperature of produced slag and 1252° C. average temperature of produced blister copper.

TABLE 3

| | | Amount of material | (Weight %) | | | | |
|---|---|---|---|---|---|---|---|
| | | (kg/h) | Cu | Fe | S | $SiO_2$ | CaO |
| Processing | Copper sulfide concentrate | 1053 | 32.1 | 25.1 | 30.4 | 5.8 | — |
| | Silica | 1.5 | — | 1.4 | — | 94.4 | — |
| | Lime | 206 | — | — | — | — | 54.4 |
| Production | Molten blister Copper | 310 | 98.2 | — | 0.98 | — | — |
| | Molten slag | 611 | 3.9 | 42.0 | — | 9.9 | 16.2 |

EXAMPLE 3

A small flash smelting furnace having a reactor with an internal diameter of 1.5 m and height 3.5 m, and settler with internal diameter of 1.5 m and length 5.2 m was used, and the composition of matte, silica powder, and lime powder (each was ground to a size of 200 μm or less) was prepared to the specified ratios shown in Table 4 and dried to obtain dry ore. The aforementioned dry ore was blown into the reactor together with 50% oxygen enriched air from a concentrate burner located at the top of the reactor, to obtain blister copper and slag. There is a heavy-oil burner in the concentrate burner, and the amount of heavy oil was regulated such that a heat balance inside the reactor was maintained. Operation was carried out for three days. The obtained results are shown in Table 4. From Table 4 it can be seen that blister copper with a S grade of 0.05% was stably obtained, The smelt conditions were: 375 Nm$^3$/h blast air in the concentrate burner, oxygen-enriched air of 50% oxygen, 50 l/h heavy oil flow, 1257° C. average temperature of slag produced and 1240° C. average temperature of produced blister copper.

TABLE 4

| | Amount of material (kg/h) | Cu | Fe | S | SiO$_2$ | CaO |
|---|---|---|---|---|---|---|
| Process-ing | Matte | 1034 | 63.7 | 12.3 | 21.2 | 0.5 | — |
| | Silica | 17 | — | 1.4 | — | 94.4 | — |
| | lime | 78 | — | — | — | — | 54.4 |
| Produc-tion | Molten blister copper | 608 | 98.0 | — | 0.05 | — | — |
| | Molten slag | 311 | 14.1 | 41.9 | — | 6.0 | 14.0 |

Comparative Example 1

In a magnesia crucible maintained at 1300° C., 30 g molten matte and 40 g molten slag of the compositions shown in Table 5 were prepared, and copper sulfide concentrate of the composition similarly shown in Table 5 and SiO$_2$ (97% or more pure SiO$_2$ content) were blown into the molten bath through a lance pipe along with 95% O$_2$-5% N$_2$ (volume %) without dipping the lance pipe in.

TABLE 5

| | (Weight %) | | | | |
|---|---|---|---|---|---|
| | Cu | Fe | S | SiO$_2$ | CaO |
| Molten matte | 76.3 | 2.8 | 20.8 | — | — |
| Molten slag | 5.0 | 42.0 | — | 30.0 | — |
| Copper sulfide concentrate | 30.3 | 29.1 | 33.5 | 1.8 | — |

The lance pipe used for blowing was an alumina, through which 37.5 g/min of copper sulfide concentrate, 7.6 g/min of SiO$_2$ were blown along with 9.2 liter/min of 95% O$_2$-5% N$_2$ (volume %) gas.

Five minutes after the test started, owing to the formation of a high melting point substance, being a mixture of matte and produced magnetite, it was impossible to blow the raw materials to be supplied into the melt, and furthermore, these substances blocked the lance pipe, and the test could not be continued.

Comparative Example 2

In a magnesia crucible maintained at 1300° C., 60 g molten blister copper and 40 g molten slag of the compositions shown in Table 6 were prepared, and matte of the composition similarly shown in Table 6 and CaO (98% or more pure CaO content) were blown into the molten bath through a lance pipe along with 95% O2-5% N$_2$(volume %) together without dipping the lance pipe in.

TABLE 6

| | (Weight %) | | | | |
|---|---|---|---|---|---|
| | Cu | Fe | S | SiO$_2$ | CaO |
| Molten blister copper | 97.5 | — | 1.2 | — | — |
| Molten slag | 16.4 | 47.6 | — | — | 17.6 |
| Matte | 65.0 | 9.5 | 21.2 | 0.5 | — |

The lance pipe used for blowing was made of alumina, through which 20 g/min of matte and 0.73 g/min of CaO were blown along with 0.20 liter/min of 95% O$_2$-5% N$_2$ (volume %) gas.

Thirty minutes after the test started, a boiling phenomenon of the slag occurred, so that most of the melt in the crucible blew out of the crucible and the test could not be continued.

Comparative Example 3

In a magnesia crucible maintained at 1300° C., 60 g molten blister copper and 40 g molten slag of the compositions shown in Table 7 were prepared, and matte of the composition similarly shown in Table 7 and CaO (98% or pure CaO content) were blown into the molten bath through a lance pipe along with 95% O$_2$-5% N$_2$(volume %) without dipping the lance pipe in.

TABLE 7

| | (Weight %) | | | | |
|---|---|---|---|---|---|
| | Cu | Fe | S | SiO$_2$ | CaO |
| Molten blister copper | 97.5 | — | 1.2 | — | — |
| Molten slag | 16.4 | 47.6 | — | — | 15.7 |
| Matte | 65.3 | 9.7 | 21.4 | — | — |

The lance pipe used for blowing was made of alumina, through which 20 g/min of matte and 0.7 g/min of CaO were blown along with 4.2 liter/min of 95% O$_2$-5% N$_2$ (volume %) gas.

With the above described condition, the blowing was continuously carried out for 50 minutes, and after being discontinued for 10 minutes, cooling and solidification followed, and the weights and compositions of the blister copper and the slag were measured. Then by substracting the amount for each compsition from the amounts and compositions of the blister copper and the slag originally charged, the amounts and compositions of blister copper and slag produced by the reaction were calculated. The results are shown in Table 8.

While 0.06% S content of the blister copper was obtained, the copper content of the slag was high and the blister copper yield was about 80%.

TABLE 8

| | (Weight %) | | | | | |
|---|---|---|---|---|---|---|
| | Produced weight (g) | Cu | Fe | S | SiO$_2$ | CaO |
| Produced blister copper | 534 | 98.3 | — | 0.06 | — | — |
| Produced slag | 290 | 32.7 | 32.0 | — | — | 11.2 |

INDUSTRIAL APPLICABILITY

The method of the present invention, when copper sulfide concentrate or matte is oxidized continuously to produce white metal or blister copper, enables the smelting of copper sulfide concentrate which, without magnetite complications, is applicable for the treatment of copper sulfide concentrate or matte containing $SiO_2$, has less copper loss to slag, can recover copper from the slag by floatation, has high removability of As, Sb and Pb into slag, and has less damage to refractories.

What is claimed is:

1. A method of smelting copper sulfide concentrate comprising:
   oxygen-smelting the copper sulfide concentrate, which includes Fe and S, using a concentrate burner located above a melt to produce a slag and at least one of white metal, nearly white metal matte, and blister copper by adding $SiO_2$ material and CaO material to the copper sulfide concentrate as flux;
   removing most of the Fe in the copper sulfide concentrate into the slag;
   removing at least a portion of the S in the copper sulfide concentrate as $SO_2$; and
   obtaining copper from copper sulfide concentrate as at least one of white metal, nearly white matte, and blister copper;
   wherein the slag produced by oxygen-smelting the copper sulfide concentrate consists essentially of CaO, $SiO_2$, Fe oxides, and Cu oxides and has a weight ratio of CaO to ($SiO_2$+CaO) of greater than 0.6 to 0.85 and a weight ratio of Fe to ($FeO_x$+$SiO_2$+CaO) of greater than 0.5 to 0.6, and
   wherein the slag is maintained at a temperature of up to 1280° C.

2. A method of smelting copper sulfide concentrate according to claim 1, further comprising:
   slowly cooling the slag until at least a portion of the slag is solidified;
   subjecting the slag to pulverization and flotation to produce recovered copper; and
   subjecting the recovered copper to the oxygen smelting process.

3. A method of smelting copper sulfide concentrate according to claim 1, wherein the $SiO_2$ content of the copper sulfide concentrate is at least 1.7% by weight with respect to the Fe to be removed into the slag.

4. A method of smelting copper sulfide concentrate, comprising:
   oxygen-smelting the copper sulfide concentrate, which includes Fe and S, using a concentrate burner located above a melt;
   removing part of the Fe in the copper sulfide concentrate to a first slag and part of the S in the copper sulfide concentrate to $SO_2$ to produce a matte comprising FeS and $Cu_2S$;
   adding $SiO_2$ material and CaO material to the matte; and oxygen-smelting the matte to remove Fe as a second slag and to remove S as $SO_2$, thereby obtaining blister copper;
   wherein the second slag consists essentially of CaO, $SiO_2$, Fe oxides, and Cu oxides and has a weight ratio of CaO to ($SiO_2$+CaO) of greater than 0.6 to 0.85 and a weight ratio of Fe to ($FeO_x$+$SiO_2$+CaO) of greater than 0.5 to 0.6, and
   wherein the temperature of the second slag is maintained up to 1280° C.

5. A method for smelting copper sulfide concentrate according to claim 4, further comprising:
   slowly cooling at least one of the first and second slags for solidification;
   subjecting the at least one of the first and second slags to pulverization and flotation to produce recovered copper; and
   subjecting the recovered copper to the matte oxygen smelting process.

6. A method of smelting copper sulfide concentrate according to claim 4, wherein at least one of the first and second slags is maintained in a molten condition and again subjected to the matte oxygen-smelting process.

7. A method of smelting copper sulfide concentrate according to claim 4, wherein at least one of the first and second slags is cooled and solidified and then again subjected to the matte oxygen-smelting process.

8. A method of smelting copper sulfide concentrate according to claim 4, wherein the $SiO_2$ content in the matte is at least 1.7% by weight with respect to the Fe to be removed in the second slag.

9. A method of smelting copper sulfide concentrate comprising:
   oxygen-smelting the copper sulfide concentrate, which includes Fe and S, using a concentrate burner located above a melt to produce a slag and at least one of white metal, nearly white metal matte, and blister copper by adding $SiO_2$ material and CaO material to the copper sulfide concentrate as flux;
   removing most of the Fe in the copper sulfide concentrate into the slag;
   removing at least a portion of the S in the copper sulfide concentrate as $SO_2$; and
   obtaining copper from copper sulfide concentrate as at least one of white metal, nearly white matte, and blister copper;
   wherein the slag produced by oxygen-smelting the copper sulfide concentrate consists essentially of CaO, $SiO_2$, Fe oxides, and Cu oxides and has a weight ratio of CaO to ($SiO_2$+CaO) of 0.62 to 0.85 and a weight ratio of Fe to ($FeO_x$+$SiO_2$+CaO) of greater than 0.5 to 0.6, and
   wherein the slag is maintained at a temperature of up to 1280° C.

* * * * *